INVENTORS
Heinz W. Georgi &
Adrian P. Brokaw
BY Robert K. Schumacher
ATTORNEY

Aug. 22, 1967    H. W. GEORGI ET AL    3,337,746
ACOUSTIC WELL LOGGING WITH TIME INTERVAL MULTIPLICATION
Original Filed June 14, 1960                     6 Sheets—Sheet 2

INVENTORS
Heinz W. Georgi &
Adrian P. Brokaw
BY Robert K. Schumacher
ATTORNEY

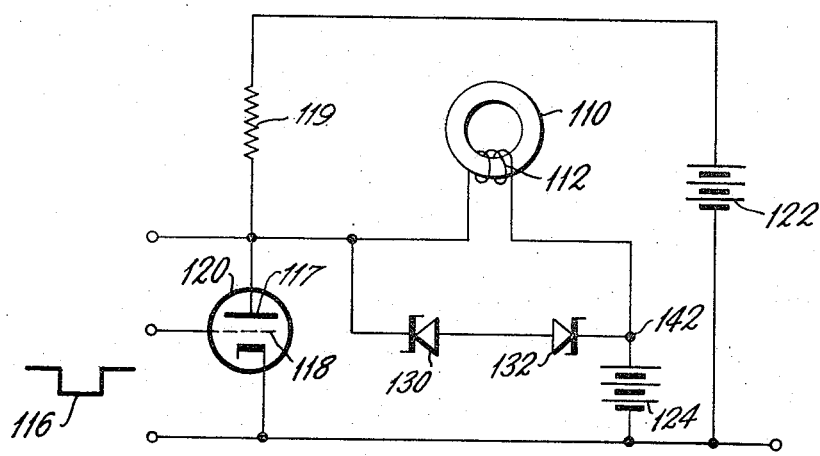
Fig. 3.
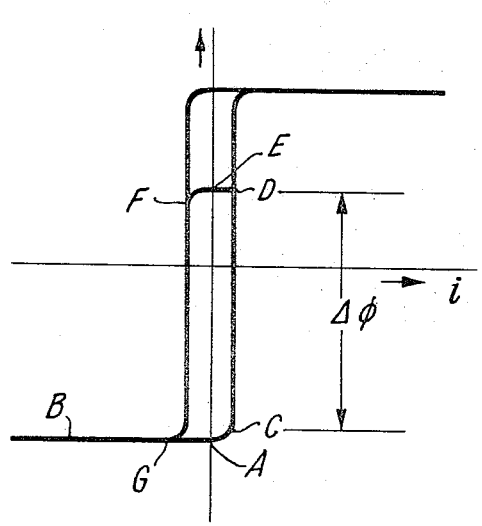
Fig. 4.a
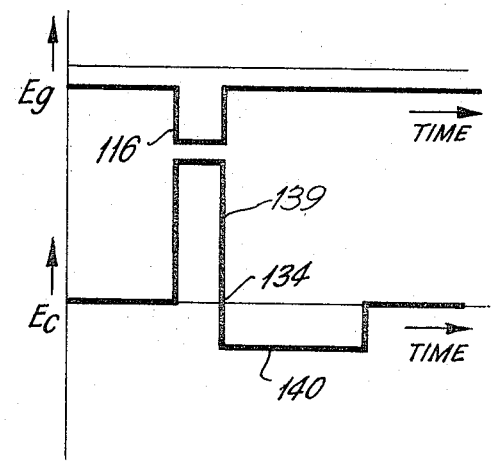
Fig. 4.b
INVENTORS
Heinz W. Georgi &
Adrian P. Brokaw
BY *Robert K. Schumacher*
ATTORNEY

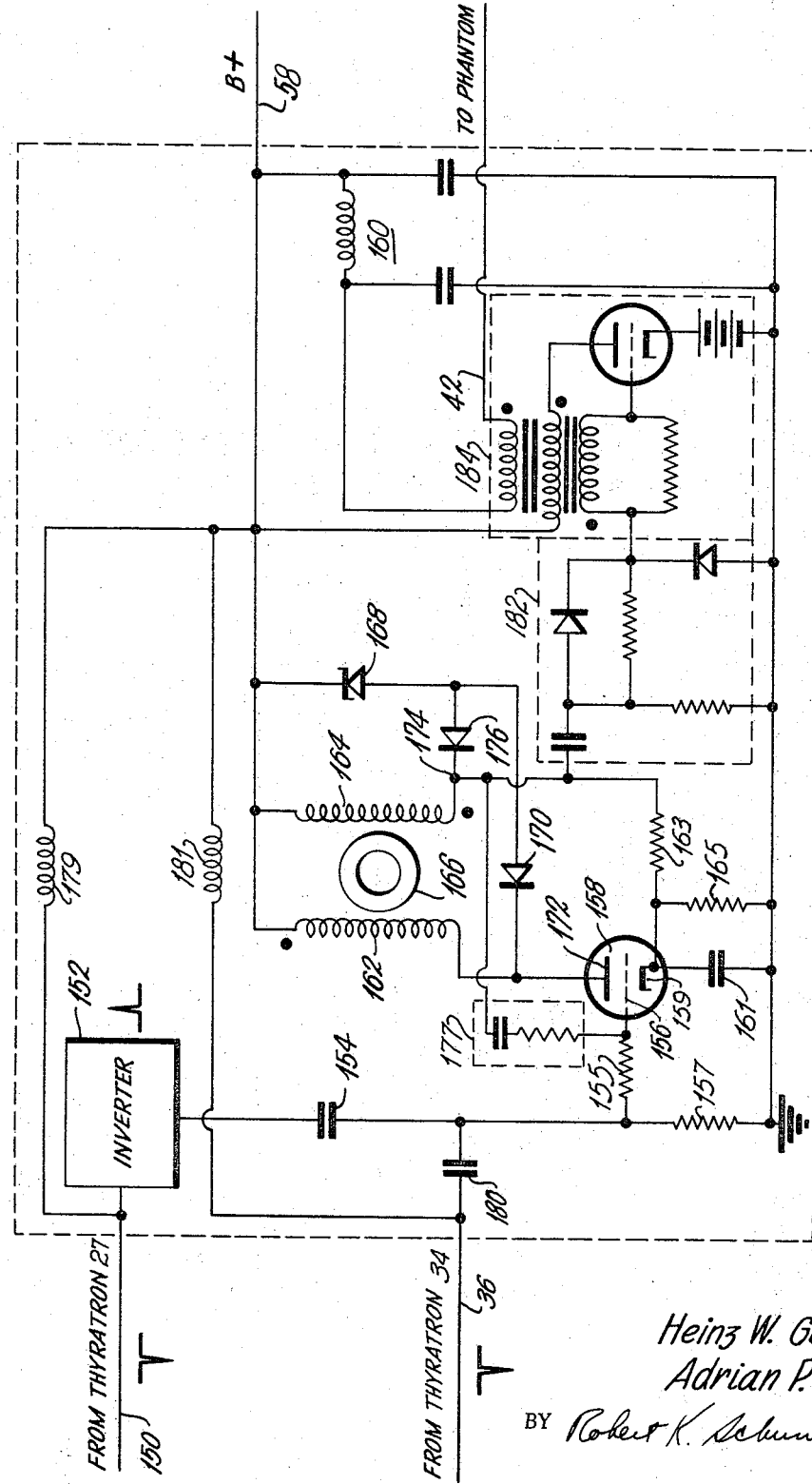

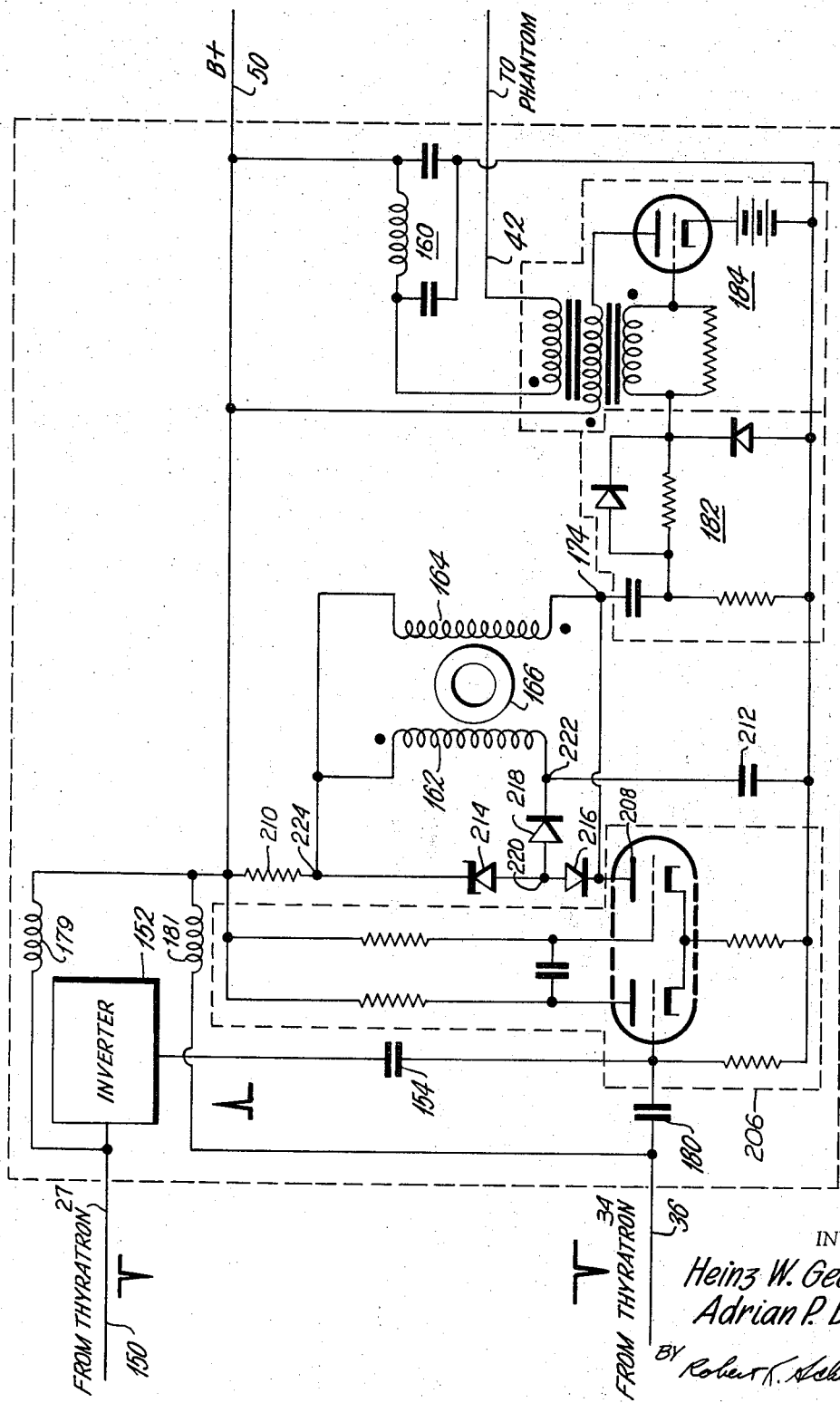

United States Patent Office

3,337,746
Patented Aug. 22, 1967

3,337,746
ACOUSTIC WELL LOGGING WITH TIME
INTERVAL MULTIPLICATION
Heinz W. Georgi, San Diego, Calif., and Adrian P. Brokaw, Woburn, Mass., assignors to Dresser Industries, Inc., Dallas, Tex., a corporation of Delaware
Continuation of application Ser. No. 35,968, June 14, 1960. This application Mar. 12, 1965, Ser. No. 442,570
11 Claims. (Cl. 307—88)

The invention relates to apparatus for stretching the time interval between pulses, which time interval is indicative of certain information useful to a recording or computing device.

This is a continuation of co-pending application Ser. No. 35,968, filed June 14, 1960 by Heinz W. Georgi and Adrian P. Brokaw.

More particularly, the present invention relates to apparatus for stretching the time interval between pulses, in which the time interval is indicative of the porosity of rock formations surveyed by acoustic well logging tools. More specifically, one embodiment of the apparatus includes a magnetic core and circuit arrangement for developing the time stretching feature. It is within the purview of the present invention to use the magnetic core and circuit arrangement therefor, in all applications of stretching the time interval between pulses in which the information is capable of being defined as an interval between pulses.

The invention, therefore, relates generally to acoustic well logging systems for measuring the transit time interval for an acoustic impulse to pass between spaced points along a well bore, having particular reference to a system in which the spaced points are relatively close together and requiring means in an acoustic well logging tool for lengthening or stretching the time interval between electrical pulses before these electrical pulses are applied to a well logging cable for transmission to the earth's surface from the tool in the well bore.

Although this invention has more general application than to acoustic well logging, it has been particularly developed for use in acoustic well logging systems generally described in the assignee's copending application of Allen W. Engle, John L. Casey and Adrian P. Brokaw for "Acoustic Well Logging System," filed Jan. 16, 1959, having Ser. No. 787,292, now U.S. Patent No. 3,112,466, and more specifically described in assignee's copending application of Adrian P. Browak for "Simultaneous Dual Spaced Acoustic Well Logging System," filed June 14, 1960, having Ser. No. 35,969. Without setting forth in detail the system of said copending applications, the present invention and the apparatus therefor will be described in connection therewith. In said copending applications, a system is disclosed wherein a pair of electrical pulses are derived, the time interval therebetween being equal to the time interval between the times of reception of an acoustic impulse arriving at a pair of spaced receiving transducers. Where the receiving transducers are sufficiently spaced apart, the electrical impulses may be applied directly to a well logging cable without delaying the second pulse, or otherwise stretching or lengthening the time interval between the pulses. It is to be noted, however, that the time interval between the two pulses is a measurable indication of the transit time of acoustic wave energy to pass through formations surrounding the bore hole. The inverse of this measurable indication is proportional to the velocity of sound in, and related to the porosity of, the particular formation adjacent which the well logging instrument or tool is passing at a particular time.

It has been found in order to resolve thin strata of rock, etc., adjacent a well logging tool and to obtain a high resolution of thin beds along a bore hole, that it is necessary for the two receiving transducers of the logging tool to be positioned relatively close together to permit measurements extending over the short intervals of the well bore. However, where the receiving transducers are thus closely spaced, it is not practical to apply the electrical pulses in the acoustic well logging tool directly to the cable for coupling to the earth's surface. This is for the reason that precise measurements are not obtained that would resolve the characteristics of the thin strata adjacent the tool. Over long lengths of cable the electrical pulses, however short in duration, tend to become longer so that the time resolution between the pulses is inaccurate. The pulses become so distorted and lengthened by traversing the cable that when they are closely spaced together they arrive at the earth's surface either as two separate long width pulses, or as one extended irregular pulse, so that the pulses cannot be precisely distinguished, and more particularly the time interval therebetween, if any, is not accurately measurable. Thus, with such short spacings between the pulses, it is not practical to apply the related electrical pulses directly to a well logging cable.

It is therefore contemplated in the present invention to lengthen or stretch the time interval between electrical pulses to a longer time interval proportional to the interval between the original pulses so that the derived pulses therefrom may be applied to a well logging cable without distortion of the time interval between the pulses received at the earth's surface. The surface apparatus or equipment such as shown and described in the aforesaid copending application Ser. No. 787,292, now U.S. Patent No. 3,112,466, requires only a change of the indication scale of the recorder to remove the proportionality factor that has been introduced by the apparatus of the present invention.

In a preferred form of the invention, the time interval between two pulses is lengthened or stretched by utilizing the flux storage properties of magnetic materials having substantially rectangular hysteresis plots or loops; that is, materials for which plots or rectangular coordinates of magnetic flux density as a function of magnetic field intensity, are substantially rectangular in form, all sides thereof being substantially parallel to the respective axes. The core is first saturated in one direction. A fixed voltage is applied to a winding of several turns about a core of such magnetic material for a time equal to the time interval between the original electric pulses. This produces a change of magnetization of the core which is substantially proportional to the time interval, so long as it is not continued to the point of saturation in the opposie direction. A different fixed voltage applied to the same winding or a different winding is used to remagnetize the core to its original condition. In that the time to magnetize the core is proportional to the time interval between a pair of pulses, the time taken to remagnetize the core to its initial condition is therefore substantially proportional to the time interval between the original electrical pulses. The beginning and ending times of re-magnetization may be indicated by a derived pair of electrical pulses, which may be sent or transmitted to the earth's surface from the logging tool and used as a proportional measure of the time interval between the reception of acoustic impulses at each of two spaced receiving transducers.

Alternatively, the re-magnetization time interval may directly follow the magnetization interval and the derived pulses may be indicative of the beginning of the magnetization and the ending of the re-magnetization. In either case the time interval between the derived pulses is substantially proportional to the transit time of an acoustic wave between the respective receiving transducers.

The primary object of the invention is to provide a means for an acoustic well logging system wherein the transit time of an acoustic impulse over a short mechanical spacing is measured by producing electrical pulses spaced by a short time interval, and then lengthening or stretching the time interval between the electrical pulses before they are applied for transmission to a well logging cable for further utilization at the earth's surface.

A further object of the invention is to provide a magnetic device having a substantially rectangular hysteresis loop for converting a time interval between pulses to a proportionally related time interval between additional pulses.

A further object of the invention is to multiply the time between two pulses so that there are produced two pulses having a time interval that is a chosen multiple or sub-multiple of the interval of time between two original pulses.

An advantage of the present invention is to make use of flux storage characteristics of magnetic materials having rectangular or substantially rectangular hysteresis loops. The original time interval information is stored in the core and after that read out again with a different voltage or with the same voltage across a different number of turns of the winding applied to the core. The voltage time integral being the same in both instances, the ratio of the read-in to read-out time is inversely proportional to the ratio of the read-in to read-out voltage per turn.

The above and other objects and advantages of the invention will become apparent from the following detailed description and accompanying drawings in which:

FIGURE 3 shows a schematic representation of a circuit mechanism illustrating the concept of the present invention;

FIGURE 4a shows a substantially rectangular plot of an hysteresis loop for a magnetic material used in the present invention;

FIGURE 4b shows a voltage diagram of the pulses used in the magnetizing and demagnetizing arrangement used in the present invention;

FIGURES 5 through 7 show particular embodiments of circuit arrangements used for lengthening or stretching the time interval between pulses in accordance with the present invention.

Figure 1:
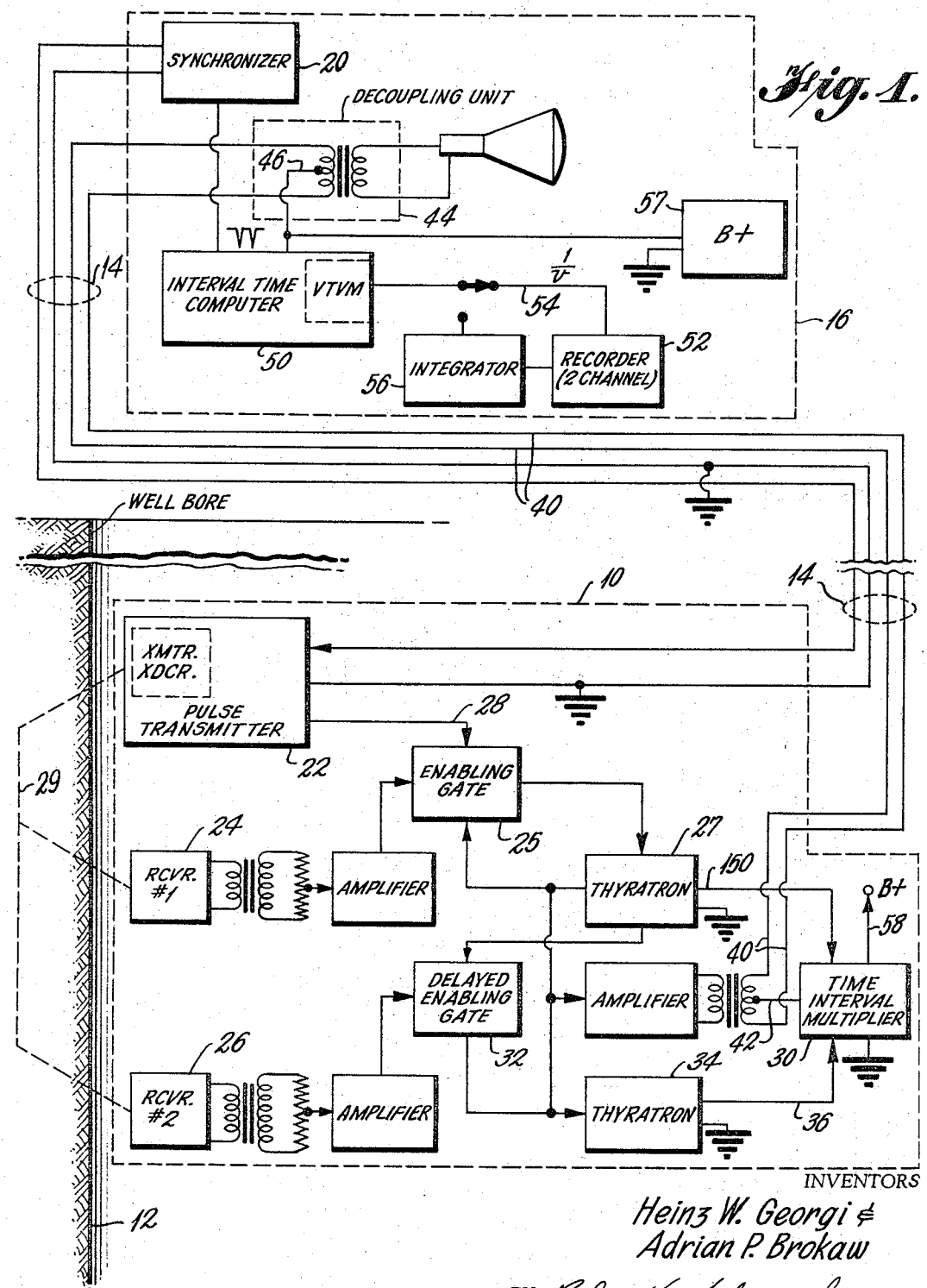
FIGURE 1 is a schematic block diagram of an acoustic well logging tool using an embodiment of the present invention.

Referring now to FIGURE 1 of the drawing, an acoustic well logging tool 10 is shown diagrammatically disposed in a well bore 12. The well logging tool is shown connected by a cable 14 to synchronizing and indicating equipment 16. In the equipment 16 is a synchronizer 20 providing pulses that are sent down the cable 14 to actuate the transmission of an acoustic pulse transmitter 22. Acoustic energy emanates generally in all radial directions from the well logging tool; the acoustic energy passing through the well bore 12 and received by receiving transducers 24, 26 is refracted by the material of the well bore so that the acoustic energy passes along the path 29.

The receiving transducers 24, 26 are spaced apart from each other. If the spacing is substantially close, the tool provides information of high resolution relating to the changes in bedrock formations along the well bore. If the spacing is substantially further apart, the tool provides information of average acoustic velocity over a greater spacing with less resolution.

As similarly described in copending application Ser. No. 787,292, now U.S. Patent No. 3,112,466, the receiving transducers 24, 26 develop electrical pulses responsive to the acoustic energy that is received. The electrical pulse from the receiving transducer 24 is amplified and passes through an enabling gate 25 to a thyratron 27 if the gate is in an open condition. The open condition of the gate is defined by the time difference between the longest and shortest time intervals necessary to receive acoustic energy at the receiving transducer 24 from a point adjacent the transmitting transducer and closes immediately after a pulse is passed through the gate.

A pulse from the acoustic pulse transmitter 22 is delayed for the shortest time interval before it is applied over conductor 28 to open the enabling gate 25. The length of the delayed pulse is sufficient to hold tthe enabling gate 25 open for the said time difference in the longest and shortest time intervals. The electrical pulse passing through the enabling gate to the thyratron is coupled back to the enabling gate to close the gate prior to the termination by the delayed pulse, so that subsequent random noise will not pass from the receiving transducer 24 to trigger the thyratron.

The electrical pulse from the thyratron 27 is applied to a time interval stretcher or multiplier 30.

Similarly the electrical pulse from the receiving transducer 26 is amplified and passes through a delayed enabling gate 32 to a thyratron 34 if the delayed enabling gate is open. The open condition of the gate is defined by the time difference between the longest and shortest time intervals necessary to receive acoustic energy at the transducer 26 from a point adjacent the receiving transducer. Gate 32 is actuated by a pulse from thethyratron 27, and after a delay related to the shortest time interval for acoustic energy to pass from transducer 24 to transducer 26, opens to pass signals from transducer 26 to the thyratron 34. The thyratron 34 develops an electrical pulse which is passed over the conductor 36 to the time interval multiplier 30.

Generally, the pulses applied to the time interval multiplier are spaced apart in time by an amount related to the acoustic characteristics of the well bore formations. These pulses form a pair of pulses that are applied to a phantom connected transmission line 40 by conductor 42. The transmission line 40 is part of the cable 14 and terminates in a decoupling unit 44 in the indicating equipment 16 at the earth's surface. The pair of pulses is taken off the transmission line by a phantom connection and conductor 46 and passed to an interval time computer 50 including a vacuum tube voltmeter; the output signal information of the computer and voltmeter is applied to a recorder 52 directly over a conductor 54, or may be applied to the recorder through an integrator 56 by closing a circuit related switch.

Essential to the operation of the electronics portions of the acoustic well logging tool 10 and the time interval computer 50 is a B+ voltage supply 57 in the equipment 16 that is connected to the phantom connection of the transmission line by the conductor 46. The time interval multiplier 30 receives the current from the B+ voltage supply over conductor 42 and separates the pair of pulses from the supply current and provides a terminal 58 which provides a connection to furnish B+ voltage to the electronics equipment in the well logging tool.

By coupling the electrical pulse from receiving transducer 26 to a memory device for storing the pulse momentarily until a larger value of the time interval between it and the pulse from receiving transducer 24, has been developed, it is possible to stretch or multiply the time interval between the pulses; preferably the larger value is a constant integral multiple thereof.

The memory device used in this instance may be a capacitor, or a magnetic core with a substantially square or rectangular hysteresis loop in a circuit so that the core uses the flux-storage ability of the magnetic material thereof.

Figure 2:
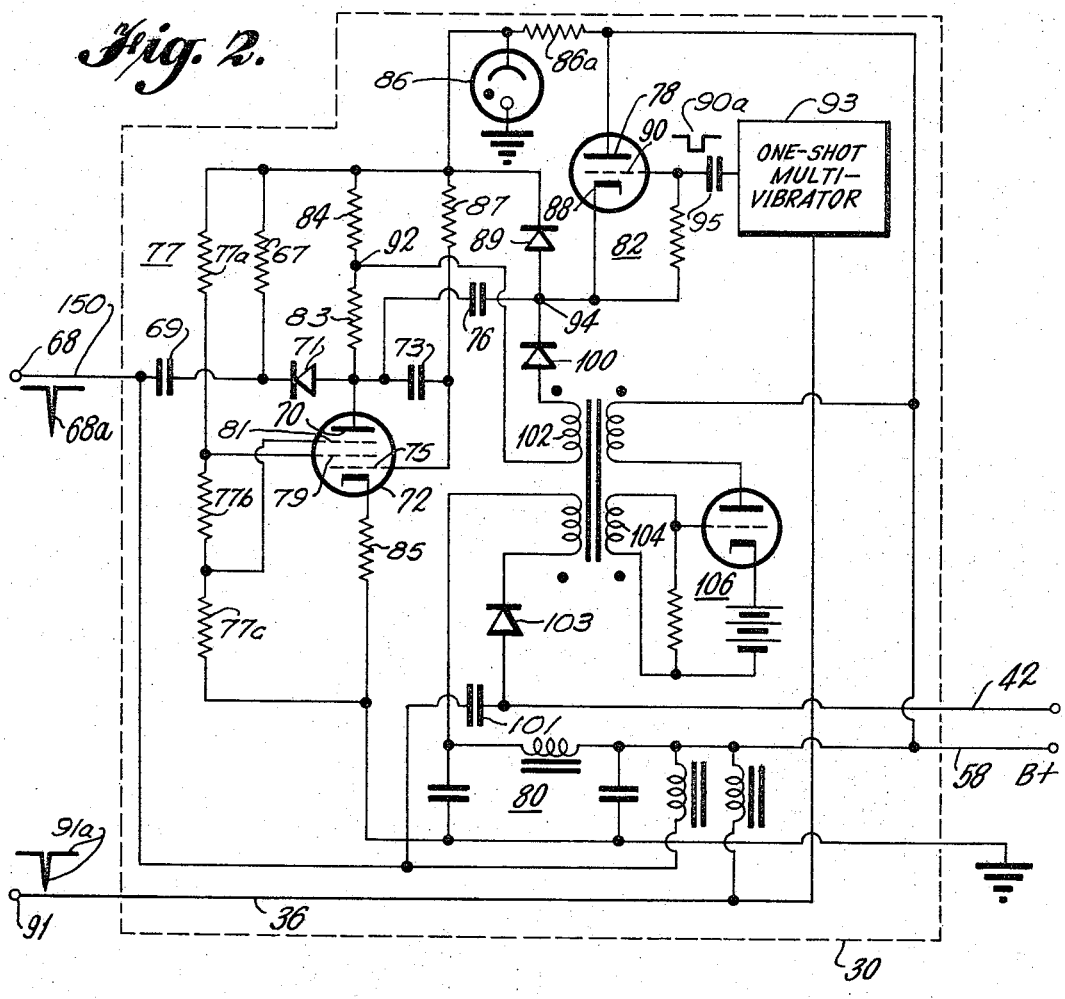
FIGURE 2 shows a phantastron circuit arrangement used for multiplying the time interval between pulses in accordance with an embodiment of the present invention.

The time interval multiplier 30 using a capacitor for stretching the time interval between a pair of pulses is accomplished by a phantastron circuit shown in FIGURE 2.

Figure 2A:
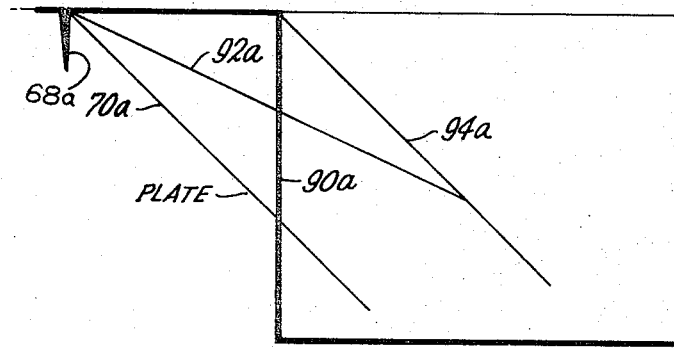
FIGURE 2a shows a voltage diagram of the phantastron circuit arrangement of FIGURE 2.

In the phantastron circuit, the receipt at input terminal 68 of a pulse 68a shown in FIGURE 2a, is the first pulse of a pulse pair and is applied from thyratron 27 over lead 150 through coupling condenser 69 and disconnect diode 71 to a plate 70 of a tube 72, and from plate 70 through condenser 73 to a control grid 75 of tube 72. Voltage divider 77, comprising series resistors 77a, 77b, and 77c, is connected between a regulated potential and ground to provide the proper coupling to the screen and suppressor grids 79 and 81, respectively, of tube 72. The cathode of tube 72 is connected to ground through resistor 85. Control grid 75 is connected to the regulated potential through resistor 87. The point between condenser 69 and diode 71 is connected to the same regulated potential through resistor 67. The circuit functions in a well-known manner so that upon receipt of a negative pulse on plate 70, the voltage at the plate 70 of the tube begins to fall. The fall in voltage at the plate is linear, or substantially so as shown by line 70a of FIGURE 2a. The potential on plate 78 is derived from line 58. A small condenser 76 is charged by the potential applied to the plate 78 of a cathode follower circuit 82 to the plate voltage of the phantastron tube 72. The plate 70 of phantastron tube 72 is connected through plate resistors 83, 84 to the regulated secondary potential provided by a dropping resistor 86a and voltage regulator tube 86. It is noted that the potential on plate 78 is higher than the potential provided by voltage regulator tube 86. The condenser 76, therefore, is connected directly between a cathode 88 of the cathode follower circuit 82 and the plate of tube 72.

A clamping diode 89 seeks to maintain the potential on the condenser 76 at the secondary potential. The cathode 88 of the cathode follower draws sufficient current to hold one end of the condenser 76 at the secondary potential so that the diode 89 prevents or clamps the potential on the condenser from exceeding the secondary potential.

The plate 70 of the phantastron continues to drop as shown by the line 70a of FIGURE 2a, and the condenser 76 then continues to be charged to a value approaching, but not exceeding the difference between the plate 70 and the secondary potential.

The second pulse of the pulse pair shown as pulse 91a of FIGURE 2, defining the end of time interval being considered, is applied to a terminal 91 from the thyratron 34. After passing through a multivibrator 93 for shaping, the pulse as shown as 90a in FIG. 2 is applied through coupling condenser 95 to grid 90 of the cathode follower tube circuit 82, and stops the charging of the condenser 76 by cutting off the cathode follower. This second pulse 90a may be of any form, such as a negative pulse which decays exponentially, a negative square wave pulse, etc., as long as the cathode follower is cut-off for a period sufficient to complete the operation.

With the cathode follower tube turned off, there is no load presented to the cathode follower side of the condenser, so that that point proceeds to a negative value at the same rate that the plate of the phantastron is still going negative.

A point 92 between plate resistors 83, 84 which also has a linear decline or fall with the plate of the phantastron tube 72, is shown on the waveform of FIGURE 2a as line 92a. Point 94 in the cathode circuit of the cathode follower, starts to fall with a slope 94a the same as the decline or fall in voltage present on the plate 70, having the slope 70a; the slope 94a starts at the receipt in the cathode follower of the stop or second pulse, and continues to a negative value.

A diode 100 and a pulse transformer 102 are connected in series between points 92 and 94.

As long as the point 94 is less negative than point 92, there is no current flow through the diode and transformer circuit, since the diode is biased against such flow of current; however, when point 94 becomes as negative or more negative than point 92, as shown in FIGURE 2a occurring when and after lines 92a and 94a intersect, then current flows through the diode 100 and transformer 102. The secondary 104 of the transformer is coupled to a triggering arrangement 106 such as a blocking oscillator, a low level discriminator, or other trigger means, to indicate the end of the stretched or multiplied interval on conductor 42.

The two plate resistors 83, 84 are in a ratio of one to two, so that the slope is a third, that is, where the resistance 84 is one-half of resistance 83, then the slope 92a is one-third of the slope of the plate voltage line 70a. Thus, it will require three times the original time interval for point 94 to drop to a voltage which is present at point 92 when lines 92a and 94a intersect.

It is possible to adjust the time interval stretch of the output trigger, by providing several taps on the plate resistors 83, 84, to change the amount of stretch or time interval multiplication, and consequently, the point of intersection of lines 92a and 94a at which point the diode and transformer will conduct.

In summary, it is essential in the phantastron circuit that the plate 70 declines in voltage upon receipt of a first pulse, that the condenser 76 charge at a corresponding rate, that a point on the plate resistor of the phantastron decline at a proportional rate to the plate 70, and that the cathode potential of the cathode follower commence similarly to decline upon initiation of a stop or second pulse 90a, marking the end of the time interval being stretched so that the equal value of the declines on the plate resistor and the cathode of the cathode follower mark the end of the stretched interval. The first pulse 68a is further applied through condenser 101 to the cable conductor 42. It is blocked from the blocking oscillator 106 by diode 103.

Another type of well-known device that may be used in the time interval multiplier is a magnetic core 110 having the characteristic of a substantially square or rectangular hysteresis loop. In this manner there is made available the flux-storage ability of the magnetic material of the core.

FIGURE 3 together with FIGURES 4a and 4b is useful in illustrating essential features in the magnetic core circuit for the operation of the flux-storage ability of the magnetic core.

Grid 118 of tube 120 is biased so as to conduct. In absence of a signal on grid 118 current from battery 122 passes through resistor 119 and thence through tube 120. Current also passes through tube 120 from battery 124 through coil 112 wound on core 110. The hysteresis loop for core 110 is as illustrated in FIG. 4a. Under normal conditions, in absence of signal, the core 110 is magnetized to the negative saturated condition identified in FIG. 4a as point B. When a negative pulse 116 is applied to grid 118, it switches off the plate current of tube 120 and current from battery 122 is then diverted through coil 112 in opposition to the current previously flowing from battery 124. Battery 122 supplies a higher voltage than battery 124, thus tending to establish a current flow through coil 112 in the direction opposite to the direction of the current previously flowing through coil 112. However, diode 130 operates to maintain the voltage applied to coil 112 at substantially a constant value. Accordingly, since the voltage is held constant, the current flowing in coil 112 begins to change exponentially with time at a rate determined by the inductance and internal resistance of coil 112. Since the resistance of coil 112 is preferably made as low as possible, the time constant for coil 112 is therefore relatively long compared to the time periods involved in the operation. Consequently, the change in the magnetization of core 110 takes place within the initial portion of the exponential, wherein the current-time relationship is almost linear. The current tending to flow to coil 112 from battery 122 shifts the "operating point" (the extent of magnetization of core 110), along the hysteresis loop shown in FIG. 4a, from point B through points A and C to point D. Initially, the inductance of coil 112 is relatively small because core 110 is saturated. Therefore, the current flowing in coil 112 changes very rapidly in magnitude until the "operating point" reaches point C on the hysteresis loop. However, at point C the inductance of coil 112 substantially increases to produce a substantial decrease in the rate of change of the current. As the operating point moves upward from point C, the current continues to change slightly until pulse 116 terminates, and the operating point reaches point D on the loop.

It should be noted that the inductance of the coil 112 is substantially constant, between points C and D, since the inductance is proportional to the slope of the hysteresis loop between points C and D. Therefore, the operating point moves from point C to point D at a constant rate since the rate of change, of the current is inversely proportional to the inductance of coil 112. Hence, the height of point D above point B is determined by the duration of pulse 116, provided that point D is never permitted to reach the area of positive saturation of the core 110. Positive saturation, of course, may be avoided by proper design of core 110 and coil 112 with respect to the maximum length anticipated for pulse 116. After the termination of pulse 116, the operating point moves backward on the loop to point E. No current flows in the coil 112, at point E, since the net voltage then being applied to coil 112 is zero. Thus, point E is the termination of the read-in period, and is shown as point 134 on the plate voltage curve $E_c$ depicted in FIG. 4b.

Termination of pulse 116 returns tube 120 to a conducting state which tends to establish a flow of current, through coil 112, in the original direction. However, the voltage across coil 112 is now limited to a maximum determined by the Zener diode 132. Accordingly, at the instant pulse 116 terminates the current in coil 112 begins to change in that direction tending to return the operating point (the exent of magneizaion of core 110) to point B on the hysteresis loop, or negative saturation. However, the operating point must move from point D, via points F and G, in returning to point B. If the voltage at diode 132 is equal to the voltage at diode 130, the operating point will move downward from point F at the same velocity with which it moved upward from point C. However, if the voltage at diode 132 is smaller, the operating point will move downward from point F at a correspondingly slower velocity. On the other hand, if the voltage at diode 132 is greater than the voltage at diode 130, then the operating point will move downward from point F at a velocity which is correspondingly faster than the velocity with which it rose from point C. Consequently, the time required for the operating point to return to point B from point D may be established at a pre-determined relationship to the time which was required for the operating point to move from point B to point D which, as has hereinbefore been stated, corresponds to the duration of pulse 116.

When the operating point reaches point B on the hysteresis loop, the inductance of coil 112 again becomes very small and the magnitude of the current flowing through coil 112 rapidly increases to its original value. At point B, however, no further change in current occurs and the voltage across coil 112 decreases, from that at diode 132, to the much lower voltage determined by the magnitude of the current flowing through coil 112, and by the internal resistance of coil 112. This sudden voltage decrease furnishes an indication of the termination of the read-out period.

FIG. 4b shows a plot of the voltage $E_g$ on grid 118 as a function of time and a plot of the voltage $E_c$ between plate 117 and point 142 as a function of time, point 142 having a fixed potential. $E_c$ is thus the voltage across winding 112. The magnitudes of the voltages of the positive and negative parts of the voltage $E_c$, 139 and 140, respectively, are equal to the Zener voltages of diodes 130 and 132, respectively. The area under the two parts are equal. The duration of part 140 is proportional to the duration of part 139, the constant of proportionality being the ratio of the Zener voltages of diodes 130 and 132, respectively.

In FIGURE 5 a time interval multiplier 30 is shown having a pair of pulses applied thereto from the thyratrons 27, 34. The first pulse of the pair is applied on conductor 150 to an inverter 152 so that a negative shaped pulse fed to the inverter input is changed to a positive output pulse. The positive pulse is coupled through a capacitor 154 and resistor 155 to a grid 156 of a tube 158 and renders the tube conductive. Resistor 157 is connected between ground and the connection between capacitor 154 and resistor 155.

Initially, without the tube 158 being conductive, a positive potential is applied from conductor 42 to conductor 58 through filter 160 which keeps fluctuations on conductor 42 from appearing in the B+ lead 58. A magnetic core 166 is normally magnetized to saturation in one direction by current flowing from B+ to ground through winding 164 on core 166 in series with resistors 163 and 165. The junction between resistors 163 and 165 is connected to cathode 159 of tube 158, and capacitor 161 is connected across resistor 165 between cathode 159 and ground.

Winding 162 on core 166 is connected between B+ and plate 172 of tube 158. When a positive pulse appears on grid 156, conduction of the tube 158 causes a voltage to be developed across winding 162 which is limited in value by the Zener diode 168 coupled through a switch diode 170. The plate 172 is thence at a relatively negative value. Transformer action through the core 166 from winding 162 to winding 164 causes point 174 to go positive in value. A diode 176 is backward biased to the positive value at point 174 so that the operation of the Zener diode 168 is not affected.

The positive potential developed at point 174 by the windings 162, 164, is fed back to the grid 156 through a network 177. This feedback path retains the conduction of the tube 158 and continues conduction until the tube becomes saturated. The continued conduction of the tube and the regulation of the voltage by the Zener diode continues to change the flux in the magnetic circuit of the core 166 so that the magnetic core tends to be oppositely magnetized for the duration of the current flow in the tube 158. As the flux continues to change, the operating point progresses along the hyteresis curve of FIGURE 4a from point C to point D as described above for FIGURE 3.

The tube 158 is cut-off by a negative pulse from the thyratron 34 applied to the grid 156 of the tube by conductor 36 and coupling capacitor 180. This negative pulse affects the plate current and makes the plate voltage go positive. This change is inverted by the transformer action of windings 162, 164 on core 166, and provides a positive feedback by way of network 177 to cause the grid to go more negative. The regenerative action now takes place in the opposite direction to maintain the tube at cut-off. As the current in winding 162 becomes zero, the operating point on the curve of FIGURE 4a passes to point E, and as the current again flows normally from B+ to ground through winding 164, the core 166 becomes remagnetized toward the initial saturation; the period of such remagnetization is regulated by the Zener diode 168 coupled to the winding 164 at point 174, when point 174 is relatively negative, by switch diode 176. Diode 170 effectively opens the connection between plate 172 and the Zener diode 168 when the plate becomes positive.

The potential at point 174 becomes negative concurrently with the reversal of current in the winding 164 becoming negative as shown after passing through point E on the curve of FIGURE 4a.

The period of remagnetization to the initial saturation condition is regulated by the Zener diode which maintains constant the voltage across winding 164. Thus the rate of change in flux per unit of time, or $-d\phi/dt$, is a constant, and the change continues until the core 166 again becomes saturated as shown at point G. The inductance then goes to zero, and point 174 goes substantially to the B+ potential. This rise in potential is the end of the multiplied time interval, and together with the initial rise in potential at this point 174 caused by the conduction of the tube 158, is coupled through a coupling network 182 to trigger a blocking oscillator 184. The two rises or pulses are separated by the multiplied time interval.

The blocking oscillator receives the two pulses from network 182 and produces sharp pulse outputs coupled to a conductor 42 to a phantom connection shown in FIGURE 1. The multiplied time interval passes to the computer 50 and the recorder 52 where the multiplied interval is recorded.

The ratio by which a time interval is multiplied in FIG. 5 relates directly to the ratio of the number of turns on the core. The Zener diode operates to control the rate at which the operating point moves along the hysteresis curve. However, the factor by which the interval is multiplied is unaffected by changes in the Zener voltage. If the Zener voltage varies over a period of time, as for example, when temperature varies, the factor by which the time interval is multipled remains unchanged, for the turns ratio cannot change.

The time interval multiplier 30 may be any of the embodiments illustrated in FIGURES 2, 3, 5, 6 or 7.

Figure 6:
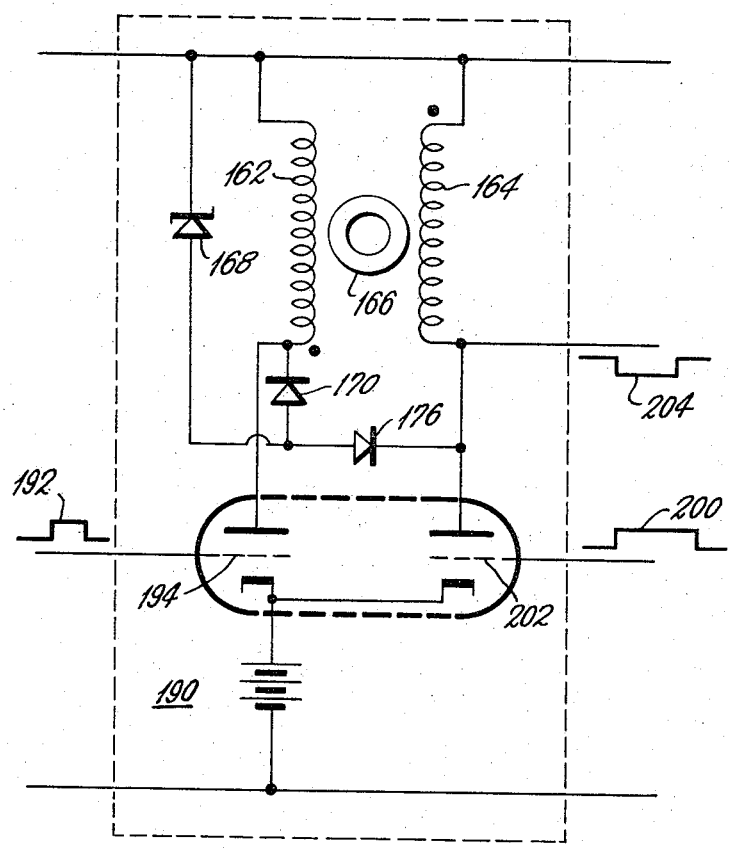

In FIGURE 6 is shown a storage core circuit 190 in which a pulse 192 representative of the time interval to be stored and multiplied, is applied to a grid 194 for the duration of the time interval. The pulse 192 by circuit connections to the core 166 tends to oppositely magnetize the cores for the duration of the time interval. When the stored and multiplied information is desired in the output, a pulse 200 is applied to the grid 202, which by circuit connections to the winding 164, derive a unidirectional current in a direction to re-magnetize the core to its initial condition of saturation. The unidirectional current may be a pulse 204, of duration that bears a pre-determined relationship to the original pulse 192.

FIGURE 7 illustrates a multivibrator arrangement 206 that forms the two input pulses received from the thyratrons of the tool into a pulse of the duration of the initial time interval to be stretched or multiplied. The multivibrator arrangement is used in lieu of the blocking oscillator trigger concept present in FIGURE 5.

The coils 162 and 164 are connected in the plate load circuit for the right triode of the multivibrator 206. Plate 208 of multivibrator 206 is connected to winding 164 in series with resistor 210 which is connected to B+. Winding 162 is connected in series with condenser 212 between resistor 210 and ground. Zener diode 214 and diode 216 are connected in series across winding 164 with the Zener diode poled to develop the characteristic Zener voltage when current is passed therethrough from B+ through the tube, and diode 216 is poled to pass current in this direction. Diode 218 is connected between the junction 220 (between diodes 214 and 216) and the junction 222 (between winding 16 and condenser 212). Diode 218 is poled to pass current from junction 20 to junction 222.

The right triode of multivibrator 206 is normally conducting. Current then flows through winding 164 and saturates core 166. Diode 218 prevents steady state current from passing through winding 162, and junction 222 therefore attains the voltage of the junction 224 between resistor 210 and winding 164. A negative pulse from thyratron 27 is inverted by inverter 152 and applied as a positive pulse through the capacitor 154 to the left grid of multivibrator 206. This triggers the multivibrator causing the voltage of plate 208 to rise. Diode 216 acts as an open circuit when plate 208 rises whereas diode 218 conducts whenever junction 220 is positive with respect to the voltage at junction 222. When the plate current of the right triode was cut off, the voltage at junction 224 also rises and current passes through winding 162 and Zener diode 214 into capacitor 212. The voltage across winding 162 is limited by the Zener voltage and tends to magnetize core 166 in the direction opposite to that in which it was originally saturaaed. Before the core is oppositely saturated a negative pulse arrives from thyratron 34 and is applied through condenser 180 to the left grid of multivibrator 206, causing the right triode to conduct, whereupon the current through winding 164 remagnetizes the core 166 in the original direction at a rate determined by the turns on the winding 164 by the voltage across the winding 164, which voltage is determined by Zener diode 214. As in the embodiment of FIG. 5, point 174 rises in potential at the beginning of opposite magnetization and upon resaturation. These rises are coupled through network 182 to trigger blocking oscillator 184 in the same manner as described above in connection with FIG. 5 and similar output pulses are applied to conductor 42 for transmission to the surface equipment for utilization.

Additional and further embodiments of the invention in this specification will occur to others and therefore it is intended that the scope of the invention be limited only by the appended claims and not by the embodiments described hereinabove.

We claim:
1. Apparatus for processing a first signal of one time duration into a second signal of predetermined proportionately related time duration, comprising a core of magnetic material in which the characteristic hysteresis loop is substantially rectangular, said core being normally magnetized to saturation in one direction, means applying a predetermined unidirectional current for the duration of the first signal in a direction tending to oppositely magnetize said core towards but not to saturation, means deriving a predetermined unidirectional current in a direction to re-magnetize the core in said one direction and produce the second signal for the duration of the re-magnetization, said duration of re-magnetization terminating upon re-saturation of the core, and means for measuring said duration of re-magnetization and relating said duration of re-magnetization to said duration of said first signal.

2. The processing apparatus of claim 1, wherein the means to oppositely magnetize the core includes a first Zener diode in circuit therewith having a predetermined voltage limiting value for controlling the rate of demagnetization, and the means to remagnetize the core in said one direction includes a second Zener diode in circuit therewith having a predetermined voltage limiting value for controlling the rate of re-magnetization of the core until the core is resaturated.

3. The processing apparatus of claim 2 wherein the predetermined unidirectional current for oppositely magnetizing and the predetermined unidirectional current for re-magnetizing are applied through the same winding disposed about said core.

4. The processing apparatus of claim 1 wherein the means to oppositely magnetize the core includes a winding of a first predetermined number of turns for controlling the rate of opposite magnetization, and the means to re-magnetize the core includes a second winding of a second predetermined number of turns for controlling the rate of remagnetization of the core in said one direction until the core is resaturated.

5. The processing apparatus of claim 4 wherein a Zener diode regulates the voltage across said first and second windings during opposite magnetization and remagnetization, respectively.

6. The processing apparatus of claim 1 wherein the means to oppositely magnetize the core includes a winding of a first predetermined number of turns for controlling the rate of partial demagnetization, the means to re-magnetize the core includes a second winding of a second predetermined number of turns for controlling the rate of remagnetization of the core in said one direction until the core is saturated, and differentiating means to produce a pair of pulses defining a time interval indicative of the remagnetization.

7. The processing apparatus of claim 1 wherein said first signal comprises a first pair of electrical pulses defining a time interval therebetween, said means to oppositely magnetize the core includes means responsive to said first pair of pulses to apply said oppositely magnetizing current for said time interval, and said means to produce the second signal produces a second pulse of a second pulse pair upon resaturation of the core.

8. The processing apparatus of claim 7 including means for utilizing the first pulse of said first pulse pair as the first pulse of the second pulse pair.

9. Apparatus for processing a first signal of one time duration into a second signal of predetermined proportionately related time duration, comprising a core of magnetic material in which the characteristic hysteresis loop is substantially rectangular, said core being normally magnetized to saturation in one direction, means applying a predetermined unidirectional current for the duration of the first signal in a direction tending to oppositely magnetize the core towards but not to saturate, means deriving a predetermined unidirectional current in a direction to re-magnetize the core in said one direction and produce the second signal for the duration of the re-magnetization, said duration terminating upon resaturation of the core, and means producing a pair of pulses having a time interval therebetween equal to the sum of duration of the opposite magnetization and of the remagnetization.

10. The processing apparatus of claim 9, wherein a Zener diode is in circuit having a predetermined voltage limiting value for controlling the rate of opposite magnetization and re-magnetization.

11. A time interval multiplier for processing a first pair of pulses spaced by a first time interval into a second pair of pulses spaced by a multiplied interval, comprising a core of magnetic material in which the characteristic hysteresis loop is substantially rectangular, said core being normally magnetized to saturation in one direction, means applying at a predetermined rate a predetermined unidirectional current for the duration of the first time interval in a direction tending to oppositely magnetize the core towards but not to saturation, means deriving a predetermined unidirectional current in a direction to re-magnetize the core in said one direction and produce the second pair of pulses having a second time interval therebetween for the duration of the re-magnetization, said duration terminating upon resaturation of the core and means for measuring said second time interval and relating said second time interval to said first time interval.

References Cited

UNITED STATES PATENTS

| | | | |
|---|---|---|---|
| 2,892,083 | 6/1959 | Norris | 328—58 |
| 2,892,975 | 6/1959 | Eilers | 307—88.5 |
| 2,952,772 | 9/1960 | Prescott | 328—58 |
| 2,996,627 | 8/1961 | Geyger | 307—88 |
| 3,027,547 | 3/1962 | Froehlich | 340—174 |
| 3,089,035 | 5/1963 | Strohmeier et al. | 307—88 |
| 3,113,290 | 12/1963 | Walker | 340—18 |
| 3,118,127 | 1/1964 | Savage | 340—18 |
| 3,156,903 | 11/1964 | Gerlach et al. | 340—174 |

BERNARD KONICK, *Primary Examiner.*

BENJAMIN A. BORCHELT, IRVING L. SRAGOW,
*Examiners.*

W. KUJAWA, H. D. VOLK, M. S. GITTES,
*Assistant Examiners.*